Figure 1:
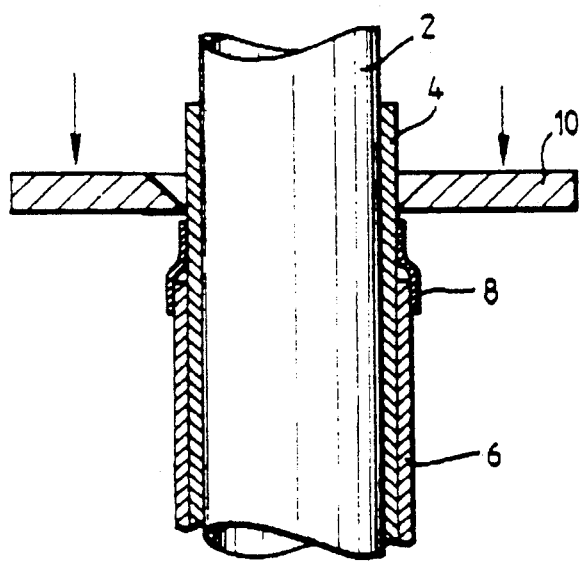

United States Patent [19]

Van Beersel

[11] Patent Number: 5,116,354
[45] Date of Patent: May 26, 1992

[54] RECOVERABLE SLEEVE ASSEMBLY FOR PIPE JOINT

[75] Inventor: Josef F. L. Van Beersel, Temse, Belgium

[73] Assignee: N. V. Raychem S.A., Belgium

[21] Appl. No.: 613,906

[22] PCT Filed: Apr. 6, 1990

[86] PCT No.: PCT/GB90/00532
§ 371 Date: Feb. 7, 1991
§ 102(e) Date: Feb. 7, 1991

[87] PCT Pub. No.: WO90/12235
PCT Pub. Date: Oct. 18, 1990

[30] Foreign Application Priority Data

Apr. 7, 1989 [GB] United Kingdom ............... 8907880

[51] Int. Cl.⁵ .................. F16L 1/028; F16L 58/18
[52] U.S. Cl. .................... 405/154; 285/381; 405/184
[58] Field of Search ............. 405/154, 157, 169, 170, 405/184; 282/381, 909

[56] References Cited

U.S. PATENT DOCUMENTS

| 4,271,329 | 6/1981 | Perelmuter | 285/381 X |
| 4,796,669 | 1/1989 | St. Onge | 405/184 X |
| 4,830,539 | 5/1989 | Akesaka | 405/184 |

FOREIGN PATENT DOCUMENTS

| 0246043 | 11/1987 | European Pat. Off. |
| 1475661 | 2/1971 | Fed. Rep. of Germany |
| 1388672 | 1/1965 | France |

Primary Examiner—David H. Corbin
Attorney, Agent, or Firm—Marguerite E. Gerstner; Edith A. Rice; Herbert G. Burkard

[57] ABSTRACT

A method of covering two or more joined pipes which are to be pulled through soil is described. The two coated pipes are bared of coating or order to join them. The bared region is covered with a first heat shrinkable sleeve, and then a second heat shrinkable sleeve is applied to overlap the first sleeve and extend beyond it in the direction of the leading edge of the joined pipes. A metal band is secured around the second sleeve at the leading edge.

14 Claims, 2 Drawing Sheets

RECOVERABLE SLEEVE ASSEMBLY FOR PIPE JOINT

This invention relates to a covering for protecting a joint between pipes when the joined pipes are to be pushed or pulled through soil.

Where pipelines are to be positioned under a road or river it is not practical to dig a trench to bury the pipe. Two main techniques are generally used for positioning the pipe. In the first technique, known as directional drilling, a non-linear hole is drilled under the road or river, and the hole is filled with a special liquid to stop the soil collapsing into the hole. In the second technique there is no pre-drilling and the pipes are simply pushed into the soil, each length of pipe being joined and pushed into position on site.

The pipelines which are used in the above techniques are typically steel pipes coated with a corrosion protective layer. The corrosion protective layer may comprise a sintered polyethylene mil coating. Also increasingly popular are multi layer coatings comprising sequentially a fusion bonded epoxy layer, a hot melt adhesive layer and an outer polyethylene layer. The protective coating is typically 1.5 to 9 mm thick. The pipes are generally joined by welding, and the protective coating is removed to bare the underlying steel in the joint region to allow the weld to be made. This region is therefore open to the atmosphere and must be recovered, for corrosion protection, before the joined pipes are buried in the soil.

There are a number of existing solutions for recovering the bared joint of the steel pipes. One solution involves sintering polyethylene material in a mold positioned around the joint, thereby reformulating the mil coating around the joint. Another solution involves priming the pipe then wrapping an epoxy coated glass fibre wrap around the pipe joint and curing the epoxy. A third solution involves a triple layer recoverable sleeve positioned over the joint region again with an epoxy primer on the outside. All these solutions are operator-sensitive and time consuming. Particularly where the pipes are to be joined on site this is particularly disadvantageous, and in some instances only one pipe length per day can be added.

Also in some of the prior art, e.g. using the triple layer recoverable sleeve and epoxy outer jacket, the leading edge of the covering is prone to fraying as pipeline is pulled or pushed through the soil on the pipe covering.

Some effort has been expended to try to decrease the profile of the covering at the joint region in order to minimize the fraying at the leading edge. However we have discovered that even though it increases the profile at the leading edge, an effective corrosion protective covering can be positioned around the joint which resists leading edge fraying by using a band, made for example from a metal, from a composite, or from an engineering plastic, the band being tightened around a combination of recoverable sleeves. Therefore a first aspect of the invention provides a method of covering a joint between two coated pipes the coating of which has been bared in the joint region, and which pipes are to be pushed or pulled through soil, the method comprising:

(i) recovering a first heat recoverable sleeve around the joint region, to cover the bared joint and to overlap the coating on either side of the joint region;

(ii) recovering a second heat recoverable sleeve to overlap the first sleeve and to extend beyond the first sleeve in a direction towards the leading edge of the pipe joint; and (iii) fastening a band around the second sleeve at the leading edge of the sleeve.

Preferably the second heat recoverable sleeve is thinner than the first heat recoverable sleeve. This means that when the band is fastened around the second sleeve there is a small step down from the sleeve to the pipe surface. Typically the first sleeve is at least 2 mm, preferably 3 mm, generally about 4 mm thick. In contrast the second sleeve is typically less than 2 mm preferably about 1 mm thick. The band is preferably 0.3 to 1.5 mm thick, typically about 0.8 mm thick.

While the double sleeve combination is preferred, it is possible to attach the band directly over the first sleeve, not using a second sleeve.

Thus, a second aspect of the invention provides a method of covering a joint between two coated pipes, the coating of which has been bared in the joint region, and which pipes are to be pushed or pulled through soil, the method comprising (i) recovering a first heat recoverable sleeve around the joint region, to cover the bared joint and to overlap the coating on either side of the joint region; and (ii) fastening a band around the first sleeve at the leading edge of the sleeve.

A third aspect of the invention provides an assembly which can be pulled or pushed through soil, comprising:

(i) two coated pipes which have been bared of coating and joined in a butting relationship;

(ii) a first heat recoverable sleeve recovered around the bared joint region to cover the bared joint and to overlap the coating on the pipes on either side of the joint;

(iii) a second heat recoverable sleeve recovered onto the first sleeve to overlap the first sleeve and to extend beyond the first sleeve in a direction towards the leading edge of the pipes; and (iv) a band fastened around the second sleeve at the leading edge of the sleeve.

A fourth aspect of the invention provides an assembly which can be pulled or pushed through soil, comprising:

(i) two coated pipes which have been bared of coating and joined in a butting relationship;

(ii) a first heat recoverable sleeve recovered around the bared joint region to cover the bared joint and to overlap the coating on the pipes on either side of the joint; and (iii) a band fastened around the first sleeve at the leading edge of the sleeve.

A heat recoverable article is one whose dimensional configuration may be made to change when subjected to an appropriate treatment. Usually these articles recover, on heating, towards an orginal shape from which they have previously been deformed, but the term "heat-recoverable" as used herein also includes an article which, on heating, adopts a new configuration, even if it has not been previously deformed. Reference may be made for example to U.S. Pat. No. 2,027,962, U.S. Pat. No. 3,086,242, U.S. Pat. No. 3,597,372, U.S. Pat. No. 2,027,962, GB 1440524.

The first heat recoverable sleeve extends over the whole of the bared portion of the joined pipes and slightly overlaps the protective coating on the pipes (e.g. the mil coating on steel pipes). The second recoverable sleeve extends over the first sleeve in a direction towards the leading edge of the pipe joint. (By leading edge is meant the edge of the joint which leads when the pipeline is pulled or pushed into the soil). The leading edge of the second recoverable sleeve is subject to abrasion as the pipeline is pulled through the soil. Thus the metal band is tightened around this leading edge. Both sleeves are preferably lined with an adhesive, preferably a heat activatable adhesive (e.g. a hot-melt adhesive), which is activated on recovery of the sleeves.

One or both of the sleeves may comprise a heat recoverable fabric. Heat recoverable fabrics are known and described, for example, in EP-A 0116393 (MP790) and in EP-A- 0117026 (RK176).

The band may (1) comprise any material having an appropriate elastic modulus, and (2) having an appropriate thickness such that it can be tightened around the sleeves, as described below, for example to a tension of 10 000N. As a preferred example, the band may comprise a metal, for example steel, a composite, for example a carbon fibre laminate, or an engineering plastic.

The band must be tightened around the leading edge of the arrangement with a tension sufficiently high that it substantially prevents fraying of the leading edge when the pipeline is pulled, or pushed through the soil. We have found that surprisingly this can be achieved without damaging the protective coating on the pipe, typically the mil coating on steel pipes.

After the band has been tensioned and released the amount of elastic energy stored in the band (if any) is not so high as to force the band through the sleeve(s) and mil coating. This ensures that the band is always separated from the pipe by the sleeves and/or mil coating. This is particularly important where the band comprises a metal.

Figure 2:
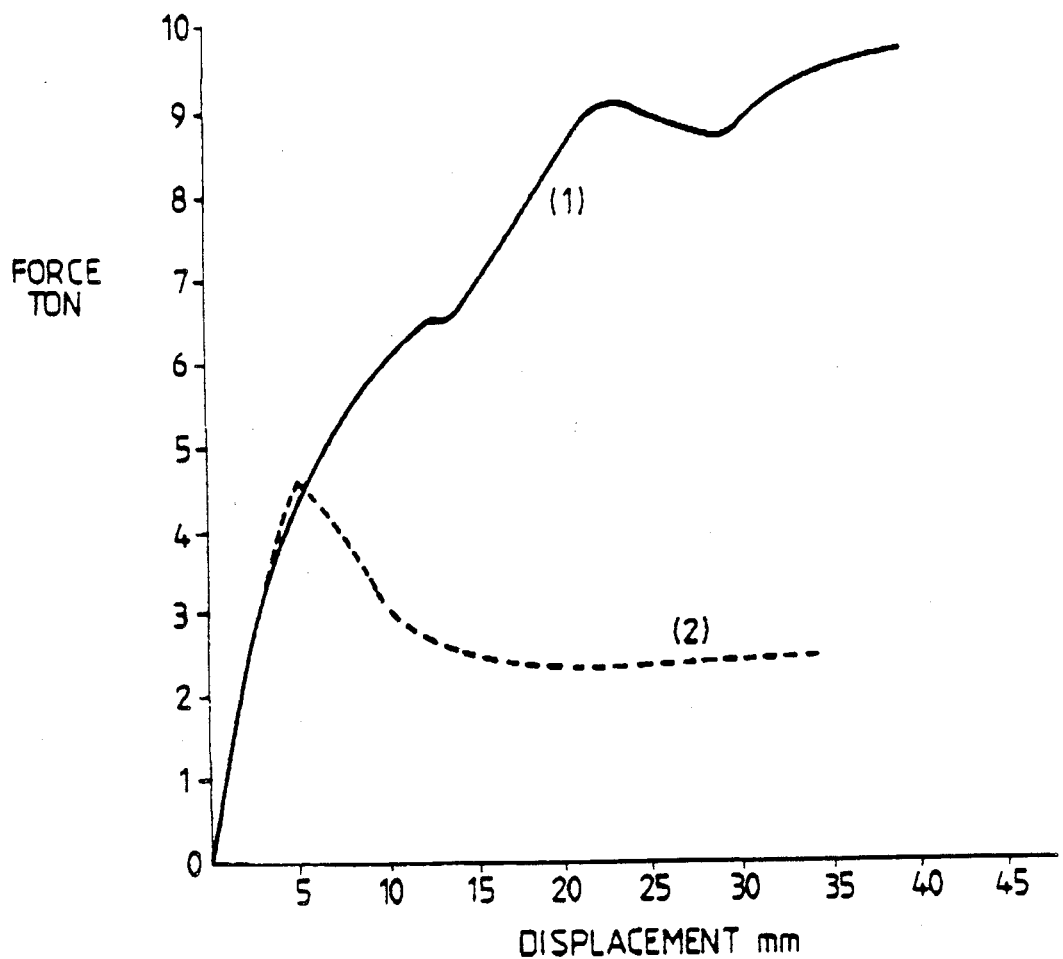

A test was devised to measure the force required to deflect or fray the leading edge of the system. The test apparatus for the test is shown in FIG. 1. A steel pipe 2 has a mil coating 4. A recoverable sleeve/metal band assembly 8 (not shown in detail) covers the mil coating. A specially calibrated plate 10 is pushed over the steel pipe/mil coating, and the force to deflect the recoverable sleeve/metal band assembly measured. FIG. 2 is a graph showing the deflection force vs the displacement (deflection). The graph is for a metal band tightened to a tension of 10000N around a pipe of diameter 16 inches. Curve (1) is for the assembly shown in FIG. 1. (The dip in the curve corresponds to the initial movement of the metal band to abut against the first sleeve of the assembly 8. This initial movement will typically occur in the preferred arrangement using first and second sleeves. Where the first sleeve is thicker, it is not possible precisely to position the metal band over the second sleeve to abut the end of the thicker first sleeve. Typically the band is positioned a small distance away form the first sleeve, and moves initially until it abuts the first sleeve). It can be seen that there is a significant displacement for forces of greater than 2, even greater than 4 tons. Curve (2) which is dotted is a comparative curve showing the force vs displacement when plate 10 is forced directly against the mil coating 6, on the pipe with no sleeve/metal band assembly 8. It can be seen that for forces up to about 4 tons the curves follow similar paths, indicating that the sleeve/metal band assembly is as resistant to displacement as the mil coating. Typically the metal band may be exposed to forces of about 1.5-2 tons as a pipe is pulled/pushed through soil.

Figure 3:
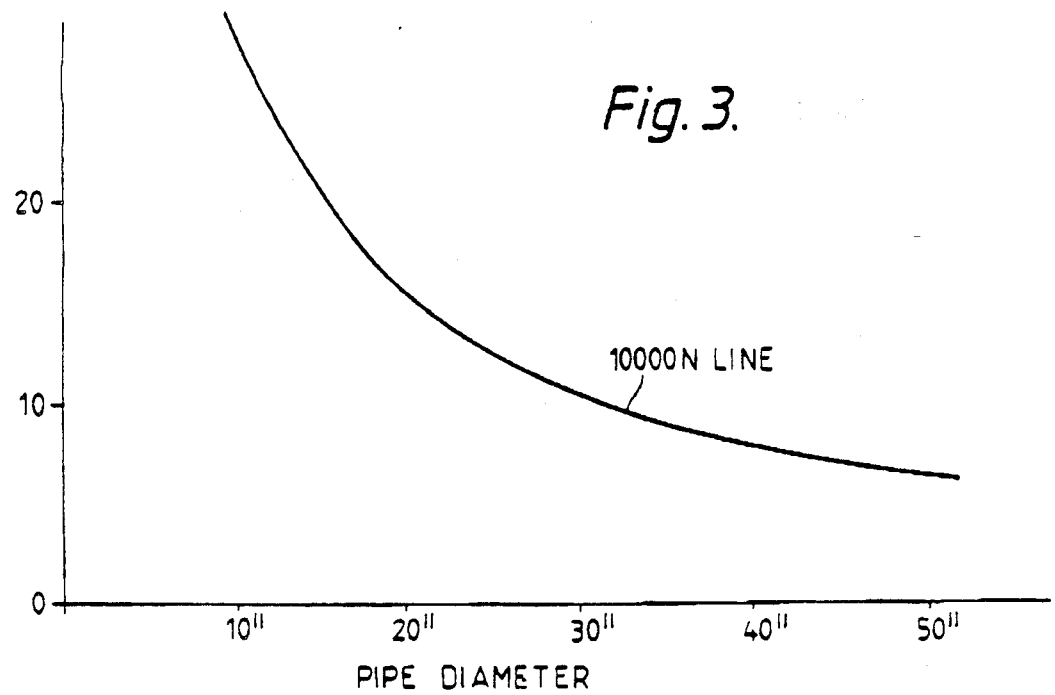

FIG. 3 shows the radial pressure in bar/cm$^2$ exerted on a pipe of various diameters by a metal band tightened to 10000N. It can be seen that the pressure is less than 10 bar/cm$^2$ on a 40 inch pipe but greater than 20 bar/cm$^2$ on a 16 inch pipe. Preferably the band is tensioned according to the pipe diameter so that it does not significantly damage mil coating. The tension required is a function of the pipe diameter.

Preferably the metal band comprises steel material. It is preferably 0.6-1 mm, typically 0.8 mm thick, and 0.8-1.2, typically 1 inch wide.

The first recoverable sleeve preferably has a thickness of 2-6 mm, typically 4 mm, and is of length sufficient to overlap the pipe coating on either side of the joint by at least 80, especially at least 100 mm. The second recoverable sleeve preferably has a thickness of 0.6-1 mm, typically 0.8 mm, and overlaps the first sleeve by at least 20, preferably at least 40 mm and the pipe coating by the same amount.

Figure 4:
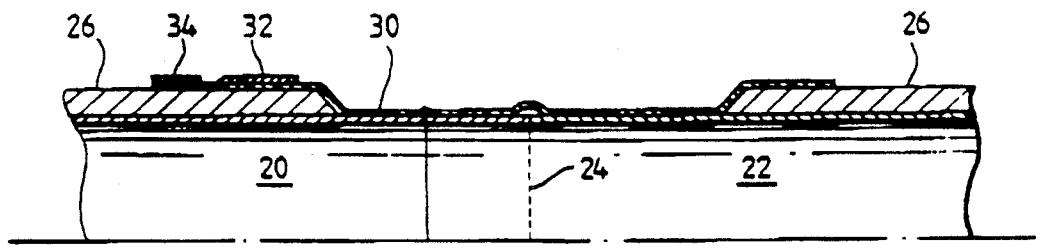

Referring to FIG. 4, steel pipes 20, 22 are welded at line 24. Each pipe 22, 24 is coated with a mil coating 26. The coating 26 has been removed around the weld line 24. A first heat recoverable sleeve 30 overlies the bared region and overlaps the mil coating 26 on either side of the bared region. The leading edge of the joined pipes is to the left of the drawings (i.e. the pipes move from right to left when pulled/pushed in the ground). Heat recoverable sleeve 32 overlaps sleeve 30 and also extends beyond sleeve 30 over the mil coating 26 in the direction of the leading edge. Metal band 34 is positioned at the leading edge of sleeve 32. For installation sleeve 30 is recovered, then sleeve 32 (e.g. with a gas torch or hot air gun or electrically). Then metal ring 34 is installed and tightened to an appropriate tension as determined by the diameter of the pipes.

I claim:

1. A method of covering a joint between two coated pipes the coating of which has been bared in the joint region, and which pipes are to be pushed or pulled through soil so that, in use, the pipe joint has a leading and a trailing edge, the method including the use of a first heat recoverable sleeve and a second heat recoverable sleeve, and the method comprising the steps of:
   (i) positioning the first heat recoverable sleeve around the joint region so that it covers the bared joint and overlaps the coating on either side of the joint region;
   (ii) heating the first heat recoverable sleeve to cause it to recover into contact with the bared joint and with the coating on either side of the joint region;
   (iii) positioning the second heat recoverable sleeve around the first sleeve and the pipe coating on at least one side of the first sleeve which side, in use, will be towards the leading edge of the pipe joint, so that the second sleeve overlaps at least part of the first sleeve and at least part of the said coating on the said at least one side of the first sleeve;
   (iv) heating the second heat recoverable sleeve to cause it to recover into contact with (a) the first sleeve and (b) the said pipe coating on at least one side of the sleeve after the heating of the first heat recoverable sleeve; and
   (v) fastening a band around the second sleeve at the edge of the sleeve which, in use, is towards the leading edge of the pipe joint.

2. A method according to claim 1, wherein the band is fastened to a tension that is high enough to prevent fraying of the second sleeve as the pipes are pushed or pulled through the soil, but that is low enough not to damage completely the underlying coating on the pipes.

3. A method according to claim 1, wherein either or both the first and second heat recoverable sleeves comprise heat shrinkable fibers.

4. A method according to claim 1 wherein the band comprises a metal.

5. A method according to claim 1, wherein the first and second sleeves are lined with adhesive.

6. An assembly which can be pulled or pushed in use through the soil, comprising:
   (i) two coated pipes which have been bared of coating and joined in a butting relationship to form a pipe joint, the pipe joint, in use, having a leading edge and a trailing edge when pushed or pulled through the soil;
   (ii) a first sleeve positioned around the bared joint region so that it covers the bared joint and overlaps the coating on the pipes on either side of the joint;
   (iii) a second sleeve positioned so that it overlaps at least part of the first sleeve and extends beyond the first sleeve in a direction towards the leading edge of the pipe joint; and
   (iv) a band fastened around the second sleeve at the edge of the sleeve which, in use, is towards the leading edge of the pipe joint,
wherein (a) the first sleeve has been so positioned by first placing a first heat recoverable sleeve around the bared pipe joint and the coating on either side thereof, then heating the first recoverable sleeve to cause it to recover and (b) the second sleeve has been so positioned by then placing a second heat recoverable sleeve so that it overlaps at least part of the first sleeve and extends beyond the first sleeve in the said direction, and then heating the second recoverable sleeve to cause it to recover.

7. An assembly according to claim 6, wherein the band comprises a metal.

8. An assembly according to claim 6, wherein the first and second sleeves are lined with adhesive.

9. A method of covering a joint between two coated pipes, the coating of which has been bared in the joint region, and which pipes are to be pushed or pulled through soil so that, in use, the pipe joint has a leading and a trailing edge, the method including the use of a first sleeve which is heat recoverable, and comprising the steps of:
   (i) positioning the first heat recoverable sleeve around the joint region, so that it covers the bared joint and overlaps the coating on either side of the joint region;
   (ii) heating the first heat recoverable sleeve to cause it to recover into contact with the bared joint and with the coating on either side of the joint region; and
   (iii) fastening a band around the first sleeve at the edge of the sleeve which, in use, is towards the leading edge of the pipe joint.

10. A method according to claim 9, wherein the band comprises a metal.

11. A method according to claim 9, wherein the first sleeve is lined with adhesive.

12. An assembly which can be pulled or pushed in use through the soil, comprising;
   (i) two coated pipes which have been bared of coating and joined in a butting relationship to form a pipe joint, the pipe joint, in use, having a leading edge and a trailing edge when pushed or pulled through the soil;
   (ii) a first sleeve positioned around the bared joint region so that it covers the bared joint and overlaps the coating on the pipes on either side of the joint; and
   (iii) a band fastened around the first sleeve at the edge of the sleeve which, in use, is towards the leading edge of the pipe joint,
wherein the first sleeve has been so positioned by placing a first heat recoverable sleeve around the bared pipe joint and then heating the first recoverable sleeve to cause it to recover.

13. An assembly according to claim 12 wherein the band comprises a metal.

14. An assembly according to claim 12, wherein the first sleeve is lined with adhesive.

* * * * *